United States Patent [19]

Lowther

[11] 4,300,486
[45] Nov. 17, 1981

[54] INTERNAL COMBUSTION ENGINE SYSTEM TECHNICAL FIELD

[75] Inventor: Frank E. Lowther, Buffalo, N.Y.

[73] Assignee: Purification Sciences Inc., Geneva, N.Y.

[21] Appl. No.: 29,884

[22] Filed: Apr. 13, 1979

Related U.S. Application Data

[63] Continuation-in-part of Ser. No. 972,786, Dec. 26, 1978, Pat. No. 4,230,075, and Ser. No. 970,320, Dec. 18, 1978, abandoned, and Ser. No. 955,896, Oct. 30, 1978, and Ser. No. 961,264, Nov. 16, 1978, Pat. No. 4,215,659, and Ser. No. 955,895, Oct. 30, 1978, and Ser. No. 951,383, Oct. 16, 1978, abandoned.

[51] Int. Cl.³ .................. F02B 33/00; F02B 75/00
[52] U.S. Cl. ......................................... 123/39; 123/68
[58] Field of Search .................................. 123/39, 68

[56] References Cited

U.S. PATENT DOCUMENTS

| | | | |
|---|---|---|---|
| 1,330,676 | 2/1920 | Blache | 123/68 |
| 2,499,642 | 3/1950 | Hannum | 123/39 |
| 2,862,482 | 12/1958 | Hart | 123/39 |
| 2,973,751 | 3/1961 | Blackmer | 123/39 |
| 3,148,688 | 9/1964 | Bianchi | 123/68 |
| 3,320,740 | 5/1967 | Hamkins | 123/68 |

*Primary Examiner*—Wendell E. Burns

[57] ABSTRACT

An internal combustion engine 10 wherein no compression function is carried out in the engine 10 and including a tank 30 of compressed air, a pressure regulator 34, a fuel injector 28, and means 40 and 42 for connecting the pressure regulator 34 and the fuel injector 28 to a foot pedal 38 for controlling air and fuel feed to the combustion chambers 22 in response to throttle demand. The engine can use spark or compression ignition and can provide full expansion. Compressed air can be generated more efficiently using central station power with a vast savings in the amount of oil consumed. The internal combustion engine system of this invention is useful in all applications for such engines including vehicles such as automobiles, trucks, locomotives, marine applications, airplanes, etc. as well as non-vehicle use.

15 Claims, 6 Drawing Figures

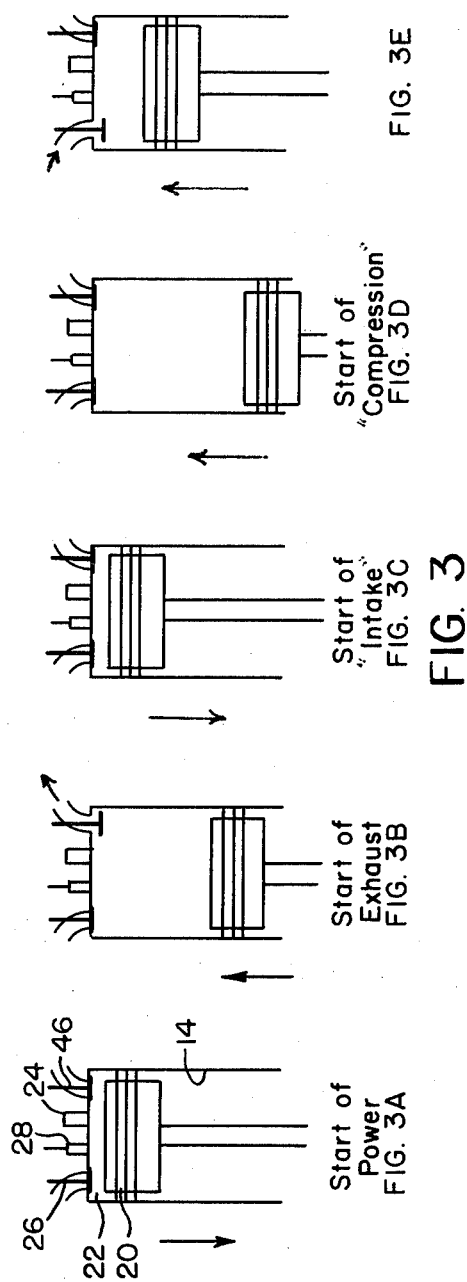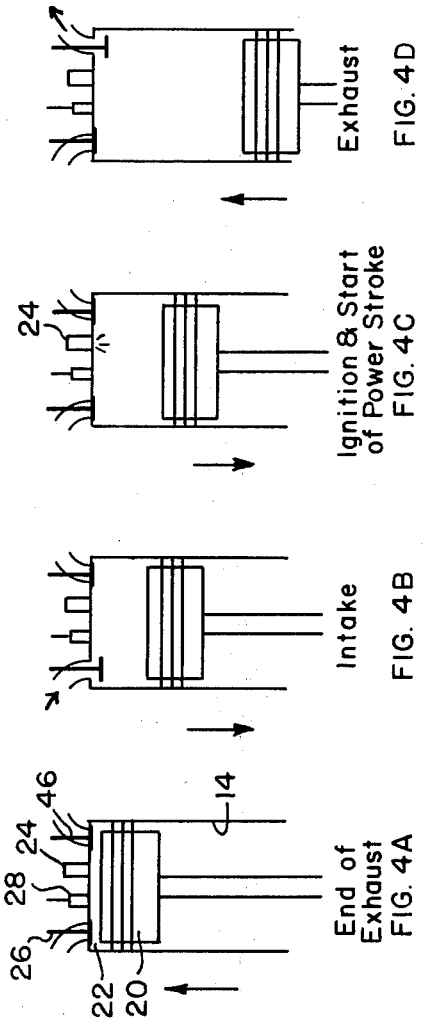

INTERNAL COMBUSTION ENGINE SYSTEM

TECHNICAL FIELD

CROSS-REFERENCE TO RELATED APPLICATIONS

This application is a continuous-in-part of applicant's copending applications: (1) Ser. No. 972,786, filed Dec. 26, 1978 now U.S. Pat. No. 4,230,075, entitled INTERNAL COMBUSTION ENGINE; (2) Ser. No. 970,320, filed Dec. 18, 1978 now abandoned, entitled INTERNAL COMBUSTION ENGINE; (3) Ser. No. 955,896, filed Oct. 30, 1978, entitled INTERNAL COMBUSTION ENGINE; (4) Ser. No. 961,264, filed Nov. 16, 1978 now U.S. Pat. No. 4,215,659, entitled INTERNAL COMBUSTION ENGINE; (5) Ser. No. 955,895, filed Oct. 30, 1978, entitled TWO STROKE INTERNAL COMBUSTION ENGINE; and (6) Ser. No. 951,383, filed Oct. 16, 1978 now abandoned, entitled INTERNAL COMBUSTION ENGINE.

TECHNICAL FIELD

This invention relates to internal combustion engines and in particular to a land vehicle and internal combustion engine system which reduces the consumption of on-board gasoline or diesel fuel.

BACKGROUND OF THE PRIOR ART

In the present day internal combustion engines, the engine carries out a compression function. I have calculated that this compression function is accomplished at a substantial cost in on-board fuel. It is done inefficiently, adiabatically, in a single stage, and in a hot cylinder. Further, fuel is burned (wasted) to do the compression even when no power is needed from the engine, such as while sitting in traffic and coasting. A diesel engine, for example, uses fuel to compress about the same amount of air each stroke at cruise speed at it does while idling in a traffic jam. In land vehicles alone, and in the U.S. alone, I have estimated that approximately 6.7 million barrels of oil are burned per day to accomplish this inefficient and wasteful task (see the calculation in Appendix A below).

The significance of the present invention is that potentially all of this oil can be saved, that is, it need be burned, therefore it need not be imported. It should be noted that it is not just that some of this oil can be saved, by doing the compression more efficiently (in plural stages, with intercooling), for example, but that substantially all of it can be saved by doing the compression with fuel such as coal, which the U.S. has in abundance.

There is prior art on using stored compressed air for starting an internal combustion engine (see for example, U.S. Pat. No. 1,849,324). Stored compressed air is also known for use in overload situations in which it is to be fed into a combustion chamber after combustion to add some extra force. Candelise, in U.S. Pat. No. 3,017,872 shows a compressor driven by the engine for supplying a tank from which compressed air is fed into a combustion chamber during the latter portion of the expansion stroke to help burn previously unburned hydrocarbons. Further, reference can be had to the prior art of record in the six patent applications of applicant incorporated by reference herein and listed in the "Summary" section below.

It is an advantage of the present invention that the need for the U.S. to import oil can be reduced and possibly eliminated.

It is an object of this invention to reduce the fuel consumption of internal combustion engines and to do so with minimum changes in the engine.

It is an object of this invention to improve the mileage (miles per gallon of fuel) of vehicles using internal combustion engines.

It is a further object of this invention to provide an internal combustion engine system in which the fuel-expensive inefficient compression function is eliminated, and in which compressed air, efficiently generated primarily from non-oil fuel is fed from a compressed air tank into the combustion chambers.

It is another object of this invention to reduce the size of internal combustion engines for the same power output; to provide a smoother running internal combustion engine and to reduce the number of cylinders needed for a certain power internal combustion engine.

It is another object and advantage of this invention that when engine power is not needed during running, that fuel is not wasted in carrying out an expensive and unnecessary compression function.

BRIEF SUMMARY OF THE INVENTION

An internal combustion engine apparatus and method wherein the compression function in the engine is eliminated along with the consequent fuel cost thereof.

An internal combustion engine system according to the present invention includes an internal combustion engine (either diesel or gasoline and either two or four stroke), modified to eliminate the compression stroke and modified to include a storage tank for pressurized air (or other oxygen-containing pressurized gas). The tank is filled from an external source of compressed air generated efficiently with central station power, preferably non-oil fueled. The engine system also includes a conduit for feeding the compressed air from the tank to the combustion chambers of the engine, means for controlling the flow of compressed air responsive to throttle demand, means for controllably feeding fuel to the combustion chambers of the engine responsive to throttle demand, and means for igniting the air/fuel mixture (either spark or compression ignition). The means for controlling the flow of compressed air is preferably a pressure regulator connected mechanically to the foot pedal. The foot pedal can also be connected to a fuel injector to control fuel feed. The hot exhaust gas is preferably heat exchanged with the compressed air being fed into the combustion chambers.

Another aspect of this invention is a method for saving oil comprising generating compressed air with central station power, transferring such compressed air into a compressed air tank on a vehicle, operating the vehicle internal combustion engine without a compression function, and controllably feeding compressed air from the tank to the combustion chamber to be ignited with fuel.

Applicant's previously filed copending patent applications: (1) Ser. No. 972,786, filed Dec. 26, 1978, entitled INTERNAL COMBUSTION ENGINE; (2) Ser. No. 970,320, filed Dec. 18, 1978, entitled INTERNAL COMBUSTION ENGINE; (3) Ser. No. 955,896, filed Oct. 30, 1978, entitled INTERNAL COMBUSTION ENGINE; (4) Ser. No. 961,264, filed Nov. 16, 1978, entitled INTERNAL COMBUSTION ENGINE; (5) Ser. No. 955,895, filed Oct. 30, 1978, entitled TWO STROKE INTERNAL COMBUSTION ENGINE; and (6) Ser. No. 951,383, filed Oct. 16 1978, entitled INTERNAL COMBUSTION ENGINE are hereby incorporated by reference in their entirety herein.

BRIEF DESCRIPTION OF THE DRAWINGS

The present invention will be more fully understood by reference to the following detailed description thereof, when read in conjunction with the attached drawings, wherein like reference numerals refer to like elements and wherein:

FIG. 3 is a partly diagrammatic, partly schematic view showing a four stroke engine cycle according to this invention;

FIG. 4 is a partly diagrammatic, partly schematic view showing a two stroke engine cycle according to this invention;

DETAILED DESCRIPTION OF THE INVENTION

Figure 1:
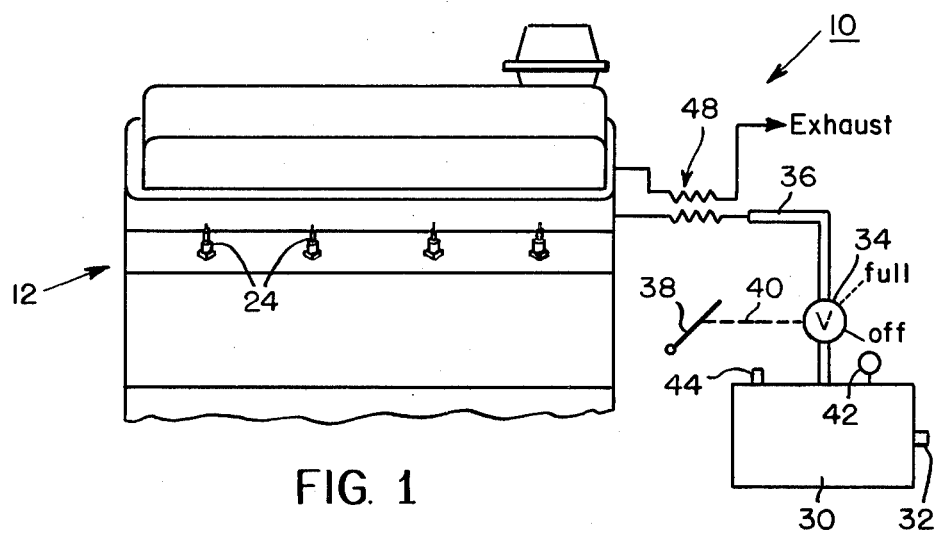
FIG. 1 is a partly diagrammatic, partly schematic view of an internal combustion engine according to one embodiment of the present invention.
Figure 2:
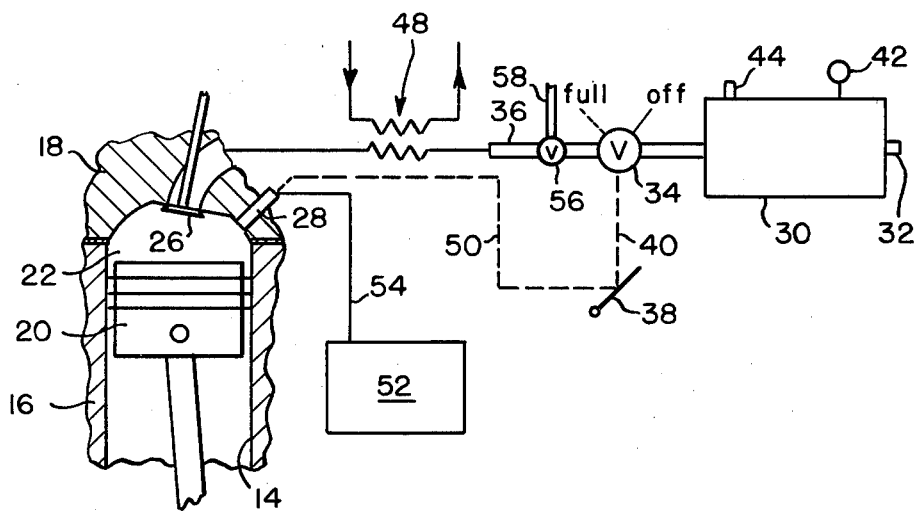
FIG. 2 is a partly diagrammatic, partly schematic partial cross-sectional view of one cylinder of the engine 10 of FIG. 1.

With reference now to the drawings, FIGS. 1 and 2 show an internal combustion engine 10 according to a preferred embodiment of the present invention. The engine 10 is a V-8 type including a pair of banks 12 of four cylinders 14 each in an engine block 16. The engine 10 includes a cylinder head 18 attached to the block 16 and a piston 20 reciprocably mounted in each cylinder 14. The cylinder 14, head 18 and piston 20 define and enclose a combustion chamber 22. The engine 10 also includes a spark plug 24 for each combustion chamber 22, an inlet valve 26, an exhaust valve (not shown) and a fuel injector 28. In addition, the engine 10 includes any of the well-known standard systems (not shown) for operating and timing the operation of the spark plugs 24, and the inlet valve 26 (modified as described below in more detail), the exhaust valve and the fuel injector 28.

The engine 10 also includes a tank 30 for holding a quantity of compressed air (e.g. up to 2500 psi or even up to 10,000 psi). Such tanks are well-known such as welders tanks, and have been certified safe for highway use. The tank is filled (e.g. through a valve 32) from an external wayside source and preferably compressed by an efficient multi-stage compressor run by central station power (and preferably of the type operating on a fuel other than oil).

The engine 10 further includes a pressure regulator 34 (also well-known as used on welder's tanks, for example) and a conduit 36 for feeding the compressed air from the tank 30 into the combustion chambers 22 through and as controlled by the inlet valves 26. The conduit 36 can branch into a plurality of conduits going directly to the inlet valves 26 or it can be connected to a high pressure manifold. The pressure regulator 34 varies and controls the pressure of the air fed out of the tank 30 in response to throttle demand by being connected to the foot pedal 38, for example. The connection 40 can be mechanical, hydraulic, pneumatic, or electrical and direct or through a microprocessor, e.g.

In operation, the inlet valve 26 is open for a specific portion of the movement of the piston 20, and the pressure regulator will control how much air at what pressure will enter the combustion chamber. The higher the throttle demand, the higher the pressure of the air fed from the tank 30 and the higher the pressure and the larger the mass of air that will enter the combustion chamber.

The foot pedal 38 is also connected at 42 to the fuel injector 28 to control the amount of fuel injected into the combustion chamber 22. The fuel injection system can be any well-known type. The timing of the fuel injection is preferably to introduce the fuel into the combustion chamber 22 after the compressed air had already been fed thereinto, however, it can also be done simultaneously or even before the air injection. The fuel injection can initiate ignition and can be supplemental to the spark ignition, or the spark ignition can be de-energized when compression ignition is present. The tank 30 can include a pressure relief safety valve 44.

FIG. 2 also shows a heat exchanger 48 for heat exchanging between the hot exhaust gas and the compressed gas just before it enters the combustion chamber 22. Also shown in FIG. 2 is a fuel tank 52 for diesel fuel, for example, connected by a conduit 54 to the fuel injector 28. The foot pedal 38 is connected by a connection 50 to the fuel injector, in any well-known manner.

Thus, the standard terms "diesel" and "gasoline" engine are not adequate for this engine. This engine 10 preferably uses a diesel type engine built for higher pressures and a higher expansion ratio. This invention can use compression ignition although in one preferred embodiment it uses spark ignition. Also, it can use the less expensive diesel fuel. The present invention can be considered a constant air/fuel ratio diesel (and in some embodiments with spark ignition).

Several embodiments are provided in the event the tank 30 is empty. In one embodiment, a valve 50 (see FIG. 2) can be operated to feed ambient air from a conduit 52 to the combustion chamber 22 instead of compressed air from the tank 30. The connection 40 between the foot pedal 38 and the pressure regulator 34 can at this time be disconnected, if desired, although it can be left connected; it would just not accomplish anything. In addition, the inlet valve 26 would then be operated as in a present day mode of operation. A different cam can be used to replace the regular cam on the inlet valve 26 to provide compression in the engine itself as in present day engines. Means for automatically switching in this different cam mechanism to operate the inlet valve can be provided with a switch on the dashboard; it can even require a manual cam replacement for one or more cylinders to provide a "limp-along" capability.

In another embodiment for use when the tank 30 is empty, the battery can be used to drive a compressor to feed enough compressed air into the tank for starting and then the same or different compressor can be driven by the engine to keep the tank sufficiently full for "limp-along" capability. It is recognized that if the fuel supply is exhausted, the engine will run at reduced power, on the stored compressed gas alone. This is a significant advantage over the conventional engine.

One aspect of the present invention is the use of the stored compressed air for use in starting the engine in place of a battery. The compressed air can also be used to fill a flat tire.

A preferred recipe for the compressed air is 40% oxygen and 60% nitrogen although any mixture percentage and types of gases can be used for various purposes. (including a wide variety of combinations of air, oxygen, carbon monoxide, carbon dioxide, nitrogen, water vapor, etc.). For example, to reduce $NO_x$ emissions a recipe of 40% oxygen, 40% nitrogen and 20% $CO_2$ can be used. There should be no $NO_x$ problem with the engine system of this invention because of the reduced air-fuel ratio and the increased efficiency (see FIG. 6).

FIG. 3 shows the four-strokes of the engine 10 of FIGS. 1 and 2. FIG. 3A shows the start of the power stroke; the inlet valve 26 and an exhause valve 46 are both closed and an air-fuel mixture in the combustion chamber 22 is ignited by the spark plug 24. FIG. 3B shows the start of the exhaust stroke (the power stroke has just ended) and the exhaust valve 46 now opens. FIG. 3C shows the end of the exhaust stroke and the exhaust valve 46 closes. FIG. 3C is labeled start of "intake" which is the normal next stroke; the intake is in quotes because there is no intake during this stroke according to this invention. The same is true for the term "compression" in FIG. 3D. The piston moves from top dead center to bottom dead center (FIGS. 3C and 3D) and then back up to about 20° before T.D.C. (FIG. 3E) with both inlet and exhaust valves closed. Normally, of course, the inlet valve would be open for the entire "inlet" stroke and both valves would be closed for the entire "compression" stroke. There is, however, no such inlet and compression stroke here. The compression function has already been accomplished using central station power and the compressed air is in the tank 30 and it is, in this embodiment, fed into the combustion chamber 22 starting in FIG. 3E when the piston is about 20° before T.D.C. and continuing until about T.D.C. at which time fuel is injected into the combustion chamber 22 and the mixture is then ignited. Ignition is shown as spark ignition though compression ingition can also be used. Fuel can be injected as in the normal diesel cycle. The 20° before T.D.C. is not critical and other timings can be used. The amount of compressed air and its pressure that will be in the combustion chamber 22 at ignition is controlled by the foot pedal 38 being connected to the pressure regulator 34. There can be a small amount of compression caused by the piston 20 moving upwardly in FIG. 3E, however, any such compression is not substantial, and the discussion herein that the engine 10 does not include a compression stroke is not to be taken as meaning absolutely zero compression in all embodiments.

The work of creating a partial vacuum in the combustion chamber 22 during what is usually the "intake" stroke is gotten back during the next stroke—what is normally the "compression" stroke. This is the presently preferred operation, however, other arrangements can be used wherein the inlet valve will be open during "intake" so as not to draw a vacuum and also open during at least most of the "compression" stroke so as not to do any compression; a surge tank can be used connected to the conduit 36 to allow flow back out the inlet valve and into such surge tank, for example. The pressure regulator 34 would prevent flow-back into the tank 30.

FIG. 4 shows a two-stroke embodiment of this invention. The FIG. 4A shows the end of the exhaust stroke.

FIG. 4B shows the inlet valve 26 open for a portion of the "power" stroke to admit compressed air from the tank 30 to the combustion chamber 22. Fuel is then injected and the air-fuel mixture ignited (FIG. 4C) to provide the "power" stroke for the remainder of the piston movement from T.D.C. to B.D.C. FIG. 4D shows the end of the power stroke and the beginning of the exhaust stroke. It is to be noted that the drawings are not to scale but are exagerated to simplify the illustration. For example, in FIG. 4 the compressed gas and fuel are fed in and ignited as close as possible to T.D.C. to provide as much expansion ratio as possible. Some of the intake can even be done prior to T.D.C. to minimize the amount of stroke used up prior to ignition and to maximize the useful expansion ratio.

Figure 5:
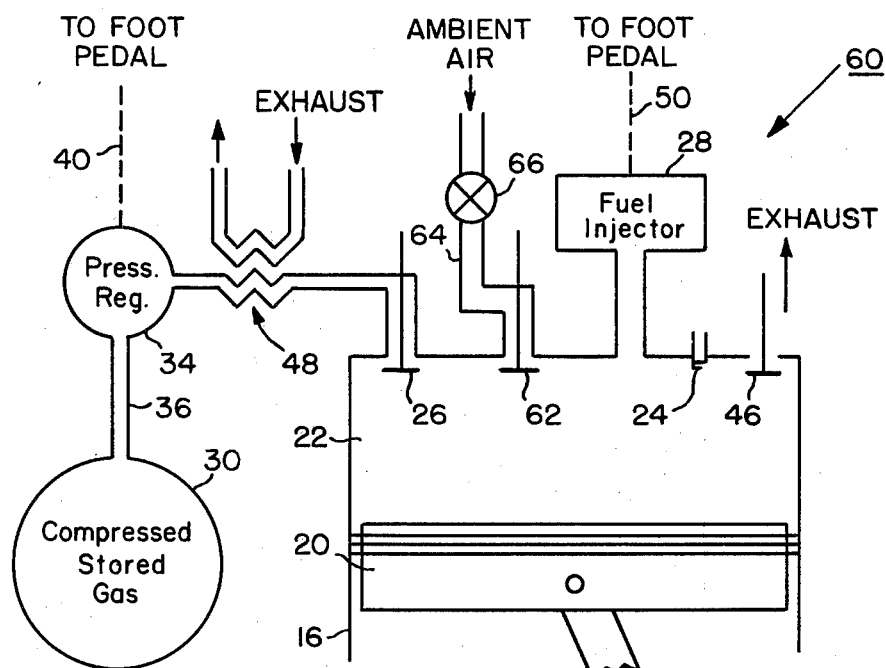
FIG. 5 is a partly diagrammatic, partly schematic view of a single cylinder showing another embodiment of the present invention.

FIG. 5 shows an engine 60 according to another embodiment of the present invention. The engine 60 includes many of the same elements of the engine 10 of FIG. 1, but in addition includes a third valve 62 controlling flow through a conduit 64 open to ambient air (or to a supercharger). This valve 62 can be operated as a normal inlet valve for limp-along, by opening a valve 66 in the conduit 64, normally closing this conduit, but opening it for limp-along when the tank 30 is empty.

Figure 6:
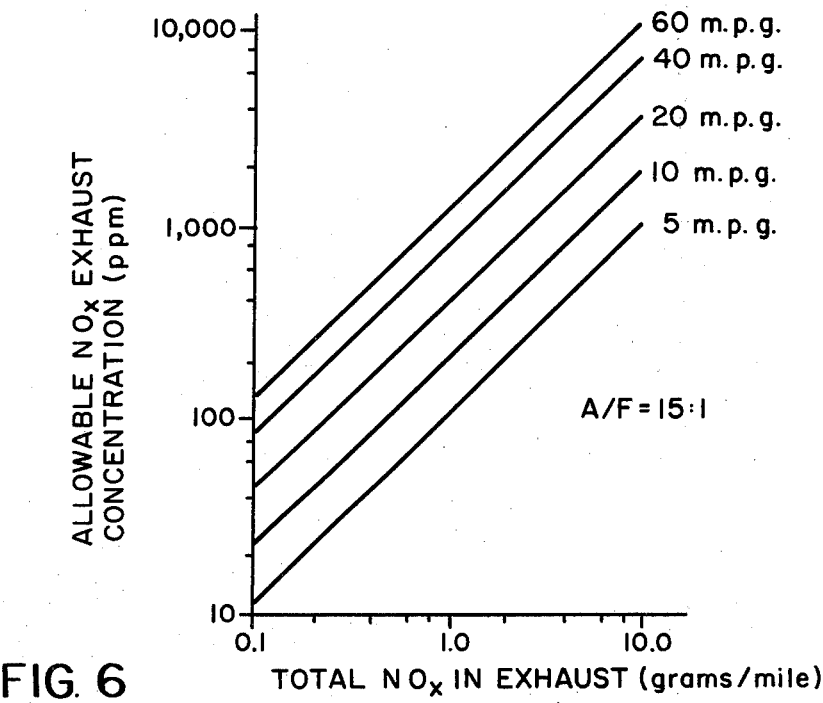
FIG. 6 is a graph of Allowable $NO_x$ Exhaust Concentration vs. Total $NO_x$ in Exhaust.

FIG. 6 is a graph that shows that the $NO_x$ problem is reduced by the present invention due to the greater efficiency and reduced air-fuel ratio.

It is preferred, though not necessary, to use diesel engines in this invention because they are designed for higher pressures and higher expansion ratios. The present invention can maintain a fixed air-fuel ratio, unlike a diesel engine. One preferred ratio of compressed gas to fuel is 8:1 (in contrast to 15:1 for a gasoline engine). A wide variety of fuels can be used including low octane fuel.

Since the fuel and compressed gas (including oxygen) can be kept separated until they are in the combustion chamber, higher percentages of pressurized oxygen can be used, such as 30%, e.g.

EXAMPLE 1

Standard diesel engine
Compression Ratio: 16:1
Compression Efficiency: 85%
Expansion Efficiency: 85%
Expansion Remaining at Fuel Cut-off: 10:1
$(\Delta T)_{burn} = 4000°$ F.
$(\Delta T)_{gas}$ Prior to Compression in Hot Cylinder = 100° F. Ambient Temperature = 70° F.

The present invention: All external compression Input gas 40% oxygen, 40% nitrogen, 20% $CO_2$
Calculate: Standard Engine $$\epsilon_{compression} = \frac{0.18 \times 630}{0.85} [16.4 - 1]$$
$$= 271 \text{ Btu/pound of air compressed}$$

$$\epsilon_{expansion} = 4630 \times 0.18 \left[\frac{1.51}{2.51}\right] \times 0.85$$
$$= 426 \text{ Btu/pound of air}$$

$$\epsilon_{out} = \epsilon_{exp.} - \epsilon_{comp.} = 426 - 271 = 155 \frac{\text{Btu}}{16.}$$
$$= \text{Useful shaft output Energy per pound of air processed.}$$

However, with all external compression as in the present invention: 100% of Expansion work is useful $\epsilon_{out} = 426$ Btu/pound $$\frac{(\epsilon_{out})\text{new}}{(\epsilon_{out})\text{old}} = \frac{426}{155} = 2.75$$

Thus, the fuel rate can be reduced by a factor of 2.75 and achieve the same useful output.

In addition, the engine of the present invention can be run hotter and the full 16:1 expansion can be achieved since burn can take place entirely at or near T.D.C. It is estimated that these two factors raise the engine thermal efficiency from about 12% to about 36% (3:1). This raises the improvement factor to $3 \times 2.75 = 8.25$.

It follows that a 20 gallon fuel tank can be replaced by a $20/8.25 = 2.42$ gallon fuel tank. This follows since the feed gas (compressed) is 40% oxygen and only (approximately) a $\frac{1}{2} \times 16:1 = 8:1$ gas/fuel ratio is required. The propellent budget now is:

| old case | 20 gal. × 6.6 lbs. | = 132 lbs. |
|---|---|---|
| present case | 2.4 × 6.6 lbs. | = 16 lbs. fuel |
| plus | 16 × 8 | = 128 lbs. air |
| | | 144 lbs. total. |

Further, the composition of the compressed gas can be controlled to control $NO_x$ pollution. The tank 30 need not be full. It can be at 2500 psi, however, 500 psi would be sufficient since the pressure regulator controls the output. Because of the absence of a compression function the operation of the engine 10 is smooth. Fewer, smaller, high pressure cylinders can be used and without a flywheel.

Another espect of the present invention is the use of high pressure air which is then reduced; all prior art tries to increase the pressure. While not much energy can be stored in the compressed air (a 50:1 difference compared to fuel, for example), it represents a large amount of energy presently required of the automobile to produce it. The compressed gas should be compressed as high as possible. The weight is not a problem; the volume is the problem. It is preferred to store the compressed gases as gases, since they come out the pressure regulator with the same composition put in the tank 30. The compressed gas can, however, be stored as a solid or cryogenic liquid (in which case it would have about twice the density of gasoline). However, it cannot just be vaporized and the gas taken off the top because the gases would come off at different times, for example.

Thus, one embodiment of this invention is to meter out the liquid phase, put it in a chamber and then vaporize it to get the desired composition of the gas to feed to the cylinder. Two main reasons for high pressure are to reduce storage volume and to allow rapid filling of the combustion chamber, with even modest valve size (this latter factor is especially important for the two-stroke engine).

Another aspect of this invention is that if the clearance gas is such that there is 2% $CO_2$ in the combustion chamber 22 from the clearance gas, the recipe of the compressed gas can be can be such as to provide 2% more oxygen. This can not be done in the present day engine, which is limited to the 20% oxygen in the atmosphere. The higher the oxygen content of the compressed gas, the higher the combustion temperature. However, various ways can be used to get the additional energy out of the engine. It is presently preferred to use 40% oxygen. The higher expansion ratio in this engine will cool this gas to prevent burning of the exhaust valve.

Another aspect of this invention is the ease of starting, because there is no compression to be done and high pressure gas is available to start the piston moving downwardly. A battery and starter motor can be eliminated and the compressed air used to start the motor. This is easily seen to be useful in the two-stroke engine in which the compressed gas is fed into the combustion chamber during the first part of each downstroke.

Another embodiment of this invention is to use the stored compressed gas only for peak power, to reduce engine size. In this case, injectors for the compressed gas can be used rather than cam driven valves.

The term "compressed air" as used in this specification and claims is hereby defined to include air and also gases with other percentages of oxygen and other gases than are present in ambient air.

Another feature of this invention is that on trucks already using a tank of cryogenic liquid such as nitrogen for maintaining fresh cargo, this tank can be the tank 30 in FIG. 1 (or at least a supplement to it). For example, instead of liquid nitrogen, the tank can be filled with liquid air, the liquid air drawn off and vaporized using exhaust gas heat, and this gas used as the compressed gas.

Another embodiment is (with reference to FIG. 3, for example), to leave the exhaust valve open from FIG. 3C to 3E wherein exhaust gas is sucked in and then pushed out, and then closing it and opening the inlet valve as shown in FIG. 3E. Another embodiment is a two stroke embodiment in which in FIG. 3B the exhaust valve is closed and the inlet valve opened at about 20° before T.D.C. in FIG. 3C to feed in the compressed gas. This would leave some exhaust gas in the combustion chamber but would elminate two of four strokes and provide a higher expansion ratio than in the two stroke engine of FIG. 4. Alternatively, where the supply of compressed gas is plentiful as on trucks, buses and locomotives, the above-described two-stroke engine can be varied by leaving the exhaust valve open for part or all of the time while compressed gas is being fed in by the inlet valve, thus exhausting more or most of the exhaust gas even through some compressed gas is lost. In the above two-stroke embodiment where the exhaust valve is closed, the dilution with exhaust gas can be overcome by increasing the pressure or oxygen content of the incoming compressed gas.

The term "compressed air" is not limited to air but includes other percentages of oxygen and other gases than are present in ambient air.

The term "piston-cylinder-combustion chamber system" is hereby defined to include all the well-known operative means for use therewith including valves, ignition means, timing means therefor, cooling means, etc.

Another embodiment of the present invention particularly useful with automobiles in contrast to trucks and locomotives, is the use of a separate compressor run by the engine to generate some compressed air to be used in conjuction with that in the storage tank. This on-board generated compressed air is mixed with the stored compressed gas and the mixture fed to the combustion chambers. This uses a little additional oil (fuel), however, it reduces the volume required of the storage tank for the compressed gas. it is noted that while the air is compressed using oil (fuel), it is a more efficient compression because it is not done in a hot cylinder. This extra compressor can be the brake-compressor described in applicant's copending application Ser. No. 926,237, filed July 20, 1978, entitled VEHICLE BRAKING AND KINETIC ENERGY RECOVERY SYSTEM, which is hereby incorporated by reference in its entirety herein.

The invention has been described in detail with particular reference to the preferred embodiments thereof, but it will be understood that variations and modifications can be affected with the spirit and scope of the invention as described hereinafter and as defined in the appended claims.

APPENDIX A

Assumptions

Trucks and Buses
  Air/Fuel=20:1 (Avg.)
  Compression Ratio=16:1 (Avg.)
Autos
  Air/Fuel=15:1 (Avg.)
  Compression Ratio=8:1 (Avg.)

Facts

Statistical Abstract of U.S. ('77 Edition)
  Auto fuel Usage (1975) $76.5 \times 10^9$ gallons/year
  Trucks and Buses (1975) $32.5 \times 10^9$ gallons/year
Mark's Mechanical Engineer's Handbook 7th Ed. Pg. 14-46) p0 Work of Compression including valve loss $$= 266 \frac{Btu}{lb. \, Air} \text{ at 16:1 Comp. Ratio}$$
$$= 172 \frac{Btu}{lb. \, Air} \text{ at 8:1 Comp. Ratio}$$

Results $$\text{Autos} = 76.5 \times 10^9 \frac{gallons}{year} \text{ gasoline}$$
$$= 2.1 \times 10^8 \frac{gallons}{day} \text{ gasoline}$$
$$= 6.99 \times 10^6 \frac{Barrels}{day} \text{ oil}$$
(at 30 gallons gasoline/barrel oil)
$$= 1.39 \times 10^9 \frac{pounds}{day} \text{ gasoline}$$
$$\text{Trucks} = 32.5 \times 10^9 \frac{gallons}{year} \text{ diesel fuel}$$
$$= 8.9 \times 10^7 \frac{gallons}{day} \text{ diesel fuel}$$
$$= 2.97 \times 10^6 \frac{barrels}{day} \text{ oil}$$
$$= 5.86 \times 10^8 \frac{pounds}{day} \text{ diesel fuel}$$

Compressed air required

Autos
$$W_{air} = 15 \times W_{fuel}$$
$$= 15 \times 1.39 \times 10^9 = 2.09 \times 10^{10} \frac{lbs}{day}$$
$$\epsilon_{(Comp. \, air)} = 2.09 \times 10^{10} \frac{lbs}{day} \times 172 \frac{Btu}{lbs.}$$
$$= 3.60 \times 10^{12} \frac{Btu}{day}$$
Trucks
$$W_{air} = 20 \times W_{fuel}$$
$$= 20 \times 5.86 \times 10^8 \frac{lbs}{day}$$
$$= 1.17 \times 10^{10} \frac{lbs}{day}$$

-continued
$$\epsilon_{(Comp. \, air)} = 1.47 \times 10^{10} \frac{lbs}{day} \times 266 \frac{Btu}{lbs}$$
$$= 3.0 \times 10^{12} \frac{Btu}{day}$$

Gasoline and diesel fuel both contain about 125,000 Btu/gallon. Allowing a liberal allowance of 30% conversion in the engine (the compressin, burn expansion cycle mnust be carried out to do the required compression). The net is 37,500 Btu/gallon. It follows that a barrel of oil contains 30×37,500 Btu's useful for compression in engine. Therefore:

$$\text{Auto} = \frac{3.60 \times 10^{12} \frac{Btu}{day}}{30 \times 37,500} = 3.2 \times 10^6 \frac{barrels}{day} \text{ of oil}$$
$$\text{Truck} = \frac{3.0 \times 10^{12}}{30 \times 37,500} = 2.7 \times 10^6 \frac{barrels}{day} \text{ of oil}$$

Thus, 3.2+3.5=6.7 million barrels/day of oil required for compression only.

The present invention gives a significant savings in oil even if the central station power is oil fueled. Perry & Chiltons "Chemical Engineer's Handbook" pg. 6–16 gives the ratio of minimum compression work (isothermal) to adiabatic work as:

$$\frac{\epsilon_{isothermal}}{\epsilon_{adiabatic}} = 0.54 \text{ at 16:1 Comp. Ratio}$$
$$= 0.64 \text{ at 8:1 Comp. Ratio}$$

The new compression work equivalents become:
Auto = $0.64 \times 3.2 \times 10^6 = 2.05 \times 10^6$
Truck = $0.54 \times 3.5 \times 10^6 = 1.89 \times 10^6$
Total = $3.94 \times 10^6$
Barrels/day oil for Comp.

Net savings of oil using oil fueled central station power to efficiently compress air is 6.7−3.94=2.76 million bar./day. The compressed air must be viewed as a lossy, intermediate energy storage method.

I claim:

1. (A) An internal combustion engine including a least one piston-cylinder-combustion chamber system;
(B) Means for operating said system to provide strokes consisting of an exhaust stroke, an intake stroke and a power stroke, with no compression stroke;
(C) A tank for storing oxygen containing compressed gas and a conduit for feeding compressed gas from said tank to said at least one combustion chamber;
(D) Means for controlling the flow of compressed gas from said tank through said conduit and to said at least one combustion chamber;
(E) Means for feeding fuel into said at least one combustion chamber; and
(F) Means for igniting a compressed gas-fuel mixture in said at least one combustion chamber;
(G) Means for feeding ambient air into said at least one combustion chamber when said tank is empty; and
(H) Means for compressing said ambient air in said at least one combustion chamber.

2. The apparatus according to claim 1 wherein said control means comprises a pressure regulator connected to a throttle for controlling the pressure of the compressed gas fed out of said tank in response to throttle demand.

3. The apparatus according to claim 1 including means for spark igniting a compressed gas-fuel mixture in said at least one combustion chamber.

4. The apparatus according to claim 1 including means for compression igniting a compressed gas-fuel mixture in said at least one combustion chamber.

5. The apparatus according to claim 1 including means for injecting fuel into said at least one combustion chamber.

6. The apparatus according to claim 5 wherein said fuel injection means comprises means for injecting fuel into said combustion chamber after said compressed gas has been fed into said combustion chamber.

7. The apparatus according to claim 5 wherein said fuel injection means comprises means for injecting fuel substantially simultaneously with the feeding of compressed gas into said combustion chamber.

8. The apparatus according to claim 5 wherein said fuel injection means includes means for injecting fuel into said combustion chamber prior to feeding compressed gas into said combustion chamber.

9. The apparatus according to claim 1 wherein said internal combustion engine is a four stroke engine.

10. The apparatus according to claim 9 including means for maintaining both the inlet and exhaust valves closed in the stroke of said at least one piston following the exhaust stroke while said piston moves from top dead center to bottom dead center.

11. The apparatus according to claim 10 including means for opening said inlet valve during a latter portion of the next stroke while said piston moves from bottom dead center to top dead center for feeding compressed gas into said combustion chamber.

12. The apparatus according to claim 1 wherein said internal combustion engine is a two stroke engine.

13. The apparatus according to claim 12 including means for opening the inlet valve during the first portion of the movement of the piston from top dead center to bottom dead center.

14. The apparatus according to claim 13 including means for igniting a compressed gas-fuel mixture in said combustion chamber after said inlet valve closes when said piston has already moved partway from top dead center to bottom dead center.

15. The apparatus according to claim 13 including means for injecting fuel into said combustion chamber during said first portion.

* * * * *